US012056488B2

(12) United States Patent
Closset et al.

(10) Patent No.: US 12,056,488 B2
(45) Date of Patent: Aug. 6, 2024

(54) QUANTIFYING SOFTWARE CODE REUSE (71) Applicants: AT&T Intellectual Property I, L.P., Atlanta, GA (US); AT&T Global Network Services Belgium Luxembourg SP, Vilvoorde (BE)

(72) Inventors: Christophe Closset, Jehay (BE); Catherine Lefevre, Corroy-le-château (BE); Sebastien Determe, Vieux-Genappe (BE); Anaël Closson, Namur (BE); Pierre Close, Esneux (BE); Richard Williams, Morganville, NJ (US)

(73) Assignees: AT&T Intellectual Property I, L.P., Atlanta, GA (US); AT&T Global Network Services Belgium Luxembourg SP, Vilvoorde (BE)

( * ) Notice: Subject to any disclaimer, the term of this patent is extended or adjusted under 35 U.S.C. 154(b) by 134 days.

(21) Appl. No.: 17/805,023

(22) Filed: Jun. 1, 2022

(65) Prior Publication Data

US 2023/0393847 A1 Dec. 7, 2023

(51) Int. Cl.
*G06F 8/75* (2018.01)
(52) U.S. Cl.
CPC ........................... *G06F 8/75* (2013.01)
(58) Field of Classification Search
CPC .......................................................... G06F 8/36
USPC .......................................................... 717/123
See application file for complete search history.

(56) References Cited

U.S. PATENT DOCUMENTS

| 8,230,392 | B2 * | 7/2012 | Joss | G06F 8/36 |
| | | | | 717/127 |
| 8,479,145 | B2 * | 7/2013 | Swaminathan | G06F 8/36 |
| | | | | 717/100 |
| 8,688,676 | B2 * | 4/2014 | Rush | G06F 16/907 |
| | | | | 707/706 |
| 9,268,805 | B2 * | 2/2016 | Crossley | G06F 8/36 |
| 9,519,464 | B2 * | 12/2016 | Dang | G06F 8/33 |

(Continued)

FOREIGN PATENT DOCUMENTS

| CA | 2956207 C | * | 3/2020 | G06F 8/20 |
| EP | 3082036 A1 | * | 10/2016 | G06F 8/36 |

OTHER PUBLICATIONS

Foreign Patent Documents: English Translation.*

(Continued)

*Primary Examiner* — Francisco J Aponte (57) ABSTRACT

A method includes generating a bill of materials for a piece of source code, where the piece of source code comprises a plurality of lines of code, providing the bill of materials to a knowledge base with a request for known call signatures, receiving, from the knowledge base, a list comprising a plurality of known call signatures and a plurality of reuse estimates, wherein each reuse estimate of the plurality of reuse estimates indicates an estimate of a number of lines of reused code associated with one call signature of the plurality of known call signatures, generating an initial calculation of a number of lines of reused code that are present in the piece of source code, using the list comprising the plurality of known call signatures, and generating a report indicating an amount of the source code that comprises reused code, based on at least the initial calculation.

20 Claims, 4 Drawing Sheets

(56) References Cited

U.S. PATENT DOCUMENTS

| | | | | |
|---|---|---|---|---|
| 9,612,831 | B2* | 4/2017 | Mendis | G06F 8/77 |
| 10,275,333 | B2* | 4/2019 | Shiraishi | G06F 11/34 |
| 10,545,733 | B2* | 1/2020 | Sabharwal | G06N 3/006 |
| 10,768,909 | B2* | 9/2020 | Ramanathan | G06F 8/36 |
| 10,810,009 | B2* | 10/2020 | van Schaik | G06F 16/90324 |
| 11,520,567 | B2* | 12/2022 | Liu | G06F 8/36 |
| 11,675,575 | B2* | 6/2023 | Huang | G06F 8/423 717/136 |
| 11,853,745 | B2* | 12/2023 | Balasubramanian | G06F 8/71 |
| 2016/0295463 | A1* | 10/2016 | Dsouza | G06F 8/00 |
| 2017/0177309 | A1* | 6/2017 | Bar-Or | G06F 8/35 |
| 2017/0371629 | A1* | 12/2017 | Chacko | G06F 8/36 |
| 2019/0121621 | A1* | 4/2019 | Aggarwal | G06N 20/00 |
| 2019/0250893 | A1* | 8/2019 | Pandit | G06N 20/00 |
| 2019/0391792 | A1* | 12/2019 | Sabharwal | G06N 3/045 |
| 2020/0348929 | A1* | 11/2020 | Sousa | G06F 8/36 |
| 2021/0081182 | A1* | 3/2021 | Seshadri | G06F 8/73 |
| 2021/0109721 | A1* | 4/2021 | Ramanathan | G06F 8/71 |
| 2021/0382712 | A1* | 12/2021 | Richman | G06N 20/00 |
| 2022/0164170 | A1* | 5/2022 | Benton | G06F 8/75 |
| 2022/0276860 | A1* | 9/2022 | Balasubramanian | G06F 8/70 |
| 2022/0276862 | A1* | 9/2022 | Balasubramanian | G06N 20/00 |
| 2022/0291921 | A1* | 9/2022 | Balasubramanian | G06F 8/10 |

OTHER PUBLICATIONS

Michail Papamichail et al. "User-Perceived Reusability Estimation Based on Analysis of Software Repositories"; Electrical and Computer Engineering Dept., Aristotle University of Thessaloniki Thessaloniki, Greece—MaLTeSQuE 2018, Campobasso, Italy; 2018 IEEE.*

Williams, Richard et al., "Quantifying the Impact of Software Code Reuse," U.S. Appl. No. 18/149,064, filed Dec. 30, 2022, 27 pages.

* cited by examiner

QUANTIFYING SOFTWARE CODE REUSE

The present disclosure relates generally to software development, and relates more particularly to devices, non-transitory computer-readable media, and methods for automated quantification of software code reuse.

BACKGROUND

The field of software development has come to rely heavily on the reuse of code, and this reliance is only expected to increase in the future. Code reuse in this context is understood to refer to the use of existing software code for a new function or software. By reusing existing code, the costs to develop new software can be lowered and the time dedicated to developing the new software can be reduced. Thus, many software development platforms may have access to an evolving repository of reusable code.

SUMMARY

The present disclosure broadly discloses methods, computer-readable media, and systems for automated quantification of software code reuse. In one example, a method performed by a processing system including at least one processor includes generating a bill of materials for a piece of source code to be analyzed, where the piece of source code comprises a plurality of lines of code, providing the bill of materials to a knowledge base, along with a request for a list of known call signatures corresponding to the bill of materials, receiving, from the knowledge base, a list comprising a plurality of known call signatures and a plurality of reuse estimates, wherein each reuse estimate of the plurality of reuse estimates indicates an estimate of a number of lines of reused code associated with one known call signature of the plurality of known call signatures, generating an initial calculation of a number of lines of reused code that are estimated to be present in the piece of source code, using the list comprising the plurality of known call signatures to generate the initial calculation, and generating a report that indicates an amount of the piece of source code that comprises reused code, based on at least the initial calculation of the number of lines of reused code that are estimated to be present in the piece of source code.

In another example, a non-transitory computer-readable medium may store instructions which, when executed by a processing system including at least one processor, cause the processing system to perform operations. The operations may include generating a bill of materials for a piece of source code to be analyzed, where the piece of source code comprises a plurality of lines of code, providing the bill of materials to a knowledge base, along with a request for a list of known call signatures corresponding to the bill of materials, receiving, from the knowledge base, a list comprising a plurality of known call signatures and a plurality of reuse estimates, wherein each reuse estimate of the plurality of reuse estimates indicates an estimate of a number of lines of reused code associated with one known call signature of the plurality of known call signatures, generating an initial calculation of a number of lines of reused code that are estimated to be present in the piece of source code, using the list comprising the plurality of known call signatures to generate the initial calculation, and generating a report that indicates an amount of the piece of source code that comprises reused code, based on at least the initial calculation of the number of lines of reused code that are estimated to be present in the piece of source code.

In another example, a device may include a processing system including at least one processor and a non-transitory computer-readable medium storing instructions which, when executed by the processing system, cause the processing system to perform operations. The operations may include generating a bill of materials for a piece of source code to be analyzed, where the piece of source code comprises a plurality of lines of code, providing the bill of materials to a knowledge base, along with a request for a list of known call signatures corresponding to the bill of materials, receiving, from the knowledge base, a list comprising a plurality of known call signatures and a plurality of reuse estimates, wherein each reuse estimate of the plurality of reuse estimates indicates an estimate of a number of lines of reused code associated with one known call signature of the plurality of known call signatures, generating an initial calculation of a number of lines of reused code that are estimated to be present in the piece of source code, using the list comprising the plurality of known call signatures to generate the initial calculation, and generating a report that indicates an amount of the piece of source code that comprises reused code, based on at least the initial calculation of the number of lines of reused code that are estimated to be present in the piece of source code.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for quantifying software code reuse in an automated manner. As discussed above, the field of software development has come to rely heavily on the reuse of code (i.e., the use of existing software code for a new function or software), and this reliance is only expected to increase in the future. By reusing existing code, the costs to develop new software can be lowered and the time dedicated to developing the new software can be reduced. Thus, many software development platforms may have access to an evolving repository of reusable code. Moreover, by building a knowledge base of internal and external reused code, a foundation can be provided for advanced capabilities, such as machine learning and artificial intelligence-based techniques which can be used to derive insights into reusable code.

However, while much literature has been dedicated to defining the advantages of code reuse, there exists little guidance as to how, exactly, to identify when code has been reused. Due to the dynamic nature of software development languages (in the intrinsic evolutions of the languages, the addition of new native reuse features, and in the introduction of newer, higher-level languages), identifying code reuse is a complex problem. Nevertheless, it may be beneficial to quantify the amount of code in a piece of software that was "reused" from other pieces of developed software code, code provided by industry partners, or open source code provided by the relevant industry.

One way to quantify the amount of code that is reused in a piece of software is to divide the number of lines of code that are reused (i.e., taken from pre-existing pieces of software) by the total number of lines of code in the piece of software. The dividend defines a percentage of the code for the piece of software that is reused. While it is relatively simple to determine the total number of lines of code in the piece of software, however, it is much more challenging to accurately determine which of those lines were reused, and even more challenging to make this determination in an automated manner.

Examples of the present disclosure provide an automated means for discovering and quantifying code reuse. In one example, each line of code in a piece of source code may be analyzed and categorized (e.g., as reused or as not reused) using a plurality of analysis techniques. In another example, the source code may be scanned for call signatures associated with known system calls, and the source code may be assigned a certain number of assumed lines of reused code for each known system call that is detected (where different system calls may be associated with different numbers of assumed lines of reused code). This may provide an initial estimate of the number of lines of reused code in the piece of source code. In a further example, if call signatures are detected in the piece of source code that cannot be matched to known system calls, then estimates of the numbers of reused lines of code associated with these call signatures may be newly calculated and used to refine the initial estimate. The newly calculated estimates may also be stored (as estimates for now-known system calls) for future use, thereby expanding the knowledge of the system as new system calls are encountered. Thus, examples of the present disclosure allow one to quantify the amount of code in a piece of source code that has been reused (e.g., as m percent of the piece of source code). These and other aspects of the present disclosure are discussed in greater detail below in connection with the examples of FIGS. 1-4.

Figure 1:
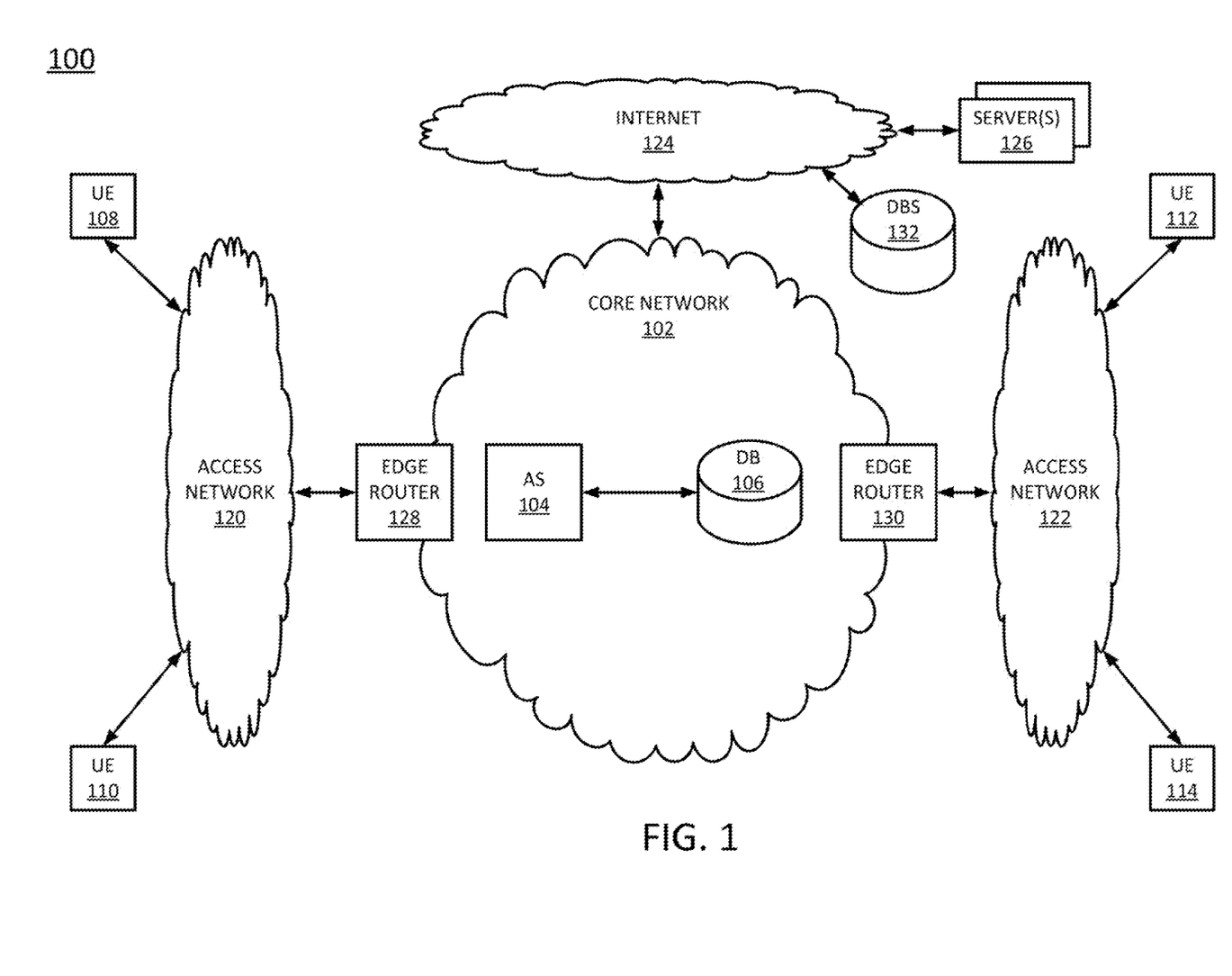
FIG. 1 illustrates an example system in which examples of the present disclosure for automated quantification of software code reuse may operate.

To further aid in understanding the present disclosure, FIG. 1 illustrates an example system 100 in which examples of the present disclosure for quantifying software code reuse in an automated manner may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices (UEs) 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to retrieve and analyze pieces of source code and to query the AS 104 and/or DB 106 for information that can be used to quantify the amount of reused code in the piece of source code, as discussed in greater detail below.

In one example, any one or more of the UEs 108-114 may execute a software application (e.g., a set of executable instructions) for automated quantification of software code reuse, in accordance with the present disclosure. For instance, the software application may be stored in a memory of a UE 108-114 and executed by a processor of the UE 108-114 to analyze a piece of source code. Under the direction of the software application, the UE 108-114 may retrieve a piece of source code to be analyzed, where the piece of source code may be stored locally on the UE 108-114 or remotely (e.g., in the DB 106 or elsewhere). The UE 108-114 may generate a bill of materials for the piece of source code, and then use the bill of materials to query the AS 104 and DB 106 (also collectively referred to herein as a "knowledge base") for known call signatures.

The UE 108-114 may scan the piece of source code to detect the occurrence of one or more of the known call signatures. When a known call signature is detected in the piece of source code, the UE 108-114 may assign to the piece of source code a reuse estimate that is associated with the known call signature. The reuse estimate may be provided by the knowledge base and may indicate an estimated number of lines of reused code that are associated with the known call signature. In other words, if the piece of source code contains a particular known call signature, then at least a given number of lines of code in the piece of source code are likely to be reused code. By aggregating the reuse estimates associated with each detected occurrence of a known call signature, an estimate of the number of lines or reused code in the piece of source code can be generated.

In some examples, the UE 108-114 may detect a call signature in the piece of source code that cannot be matched to a known call signature. In this case, the UE 108-114 may query the knowledge base for a newly generated reuse estimate for the unmatched call signature, and this newly generated reuse estimate may be aggregated with the reuse estimates associated with the known call signatures. The UE 108-114 may generate a report based on the aggregation of the reuse estimates, where the report may indicate a percentage of the lines of code in the piece of source code that comprise reused code.

In one example, one or more servers 126 and one or more databases (DBs) 132 may be accessible to user endpoint devices 108, 110, 112, and 114 via Internet 124 in general. The server(s) 126 and DBs 132 may operate in a manner similar to the AS 104 and DB 106 (e.g., as another "knowledge base"), as described in further detail below.

Figure 4:
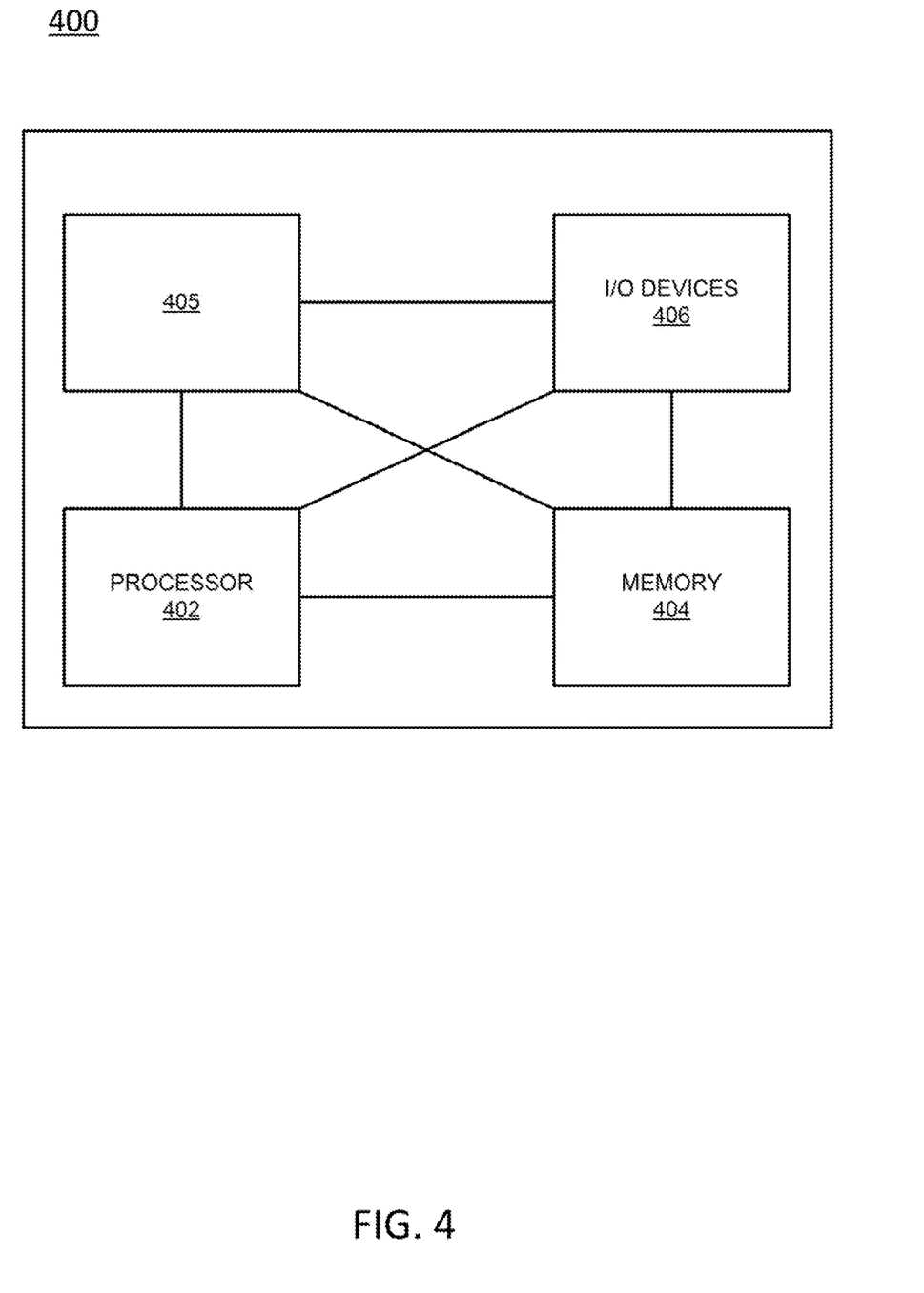
FIG. 4 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for automated quantification of software code reuse, as described herein. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to scan a bill of materials for a piece of source code and to provide, to the source of the bill of materials, a list of relevant known call signatures which may occur in the piece of source code. Each known call signature may be associated (e.g., in the DB 106) with a reuse estimate that indicates a number of lines of reused code that are likely to be present when the known call signature is detected in a piece of source code. The reuse estimate may also be associated with a confidence score (e.g., indicating a confidence that the reuse estimate is correct).

In further examples, the AS 104 may be configured to generate a new reuse estimate for a call signature that is not a known call signature (e.g., a call signature that is identified by the source of the bill of materials as not matching any known call signature). In one example, the AS 104 may retrieve data, analysis techniques, and/or other information that may aid in generating the new reuse estimate from another source, such as from the servers 126 or DB 132. By generating a new reuse estimate for the call signature, the call signature may thus become a known call signature that can be stored in the DB 106.

As discussed above, the DB 106 may store a plurality of known call signatures, along with reuse estimates that are associated with the call signatures. For instance, the DB 106 may store a mapping that maps each known call signature to a corresponding reuse estimate (e.g., estimated number of reused lines of code). In one example, the mapping may further indicate a confidence in the association between the known call signature and the reuse estimate to which the known call signature is mapped.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for automated quantification of software code reuse as described herein. One example method for automated quantification of software code reuse by a UE 108-114 (or a similar device) is described in greater detail below in connection with FIG. 2. One example method for automated quantification of software code reuse by AS 104 (or a similar device) is described in greater detail below in connection with FIG. 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
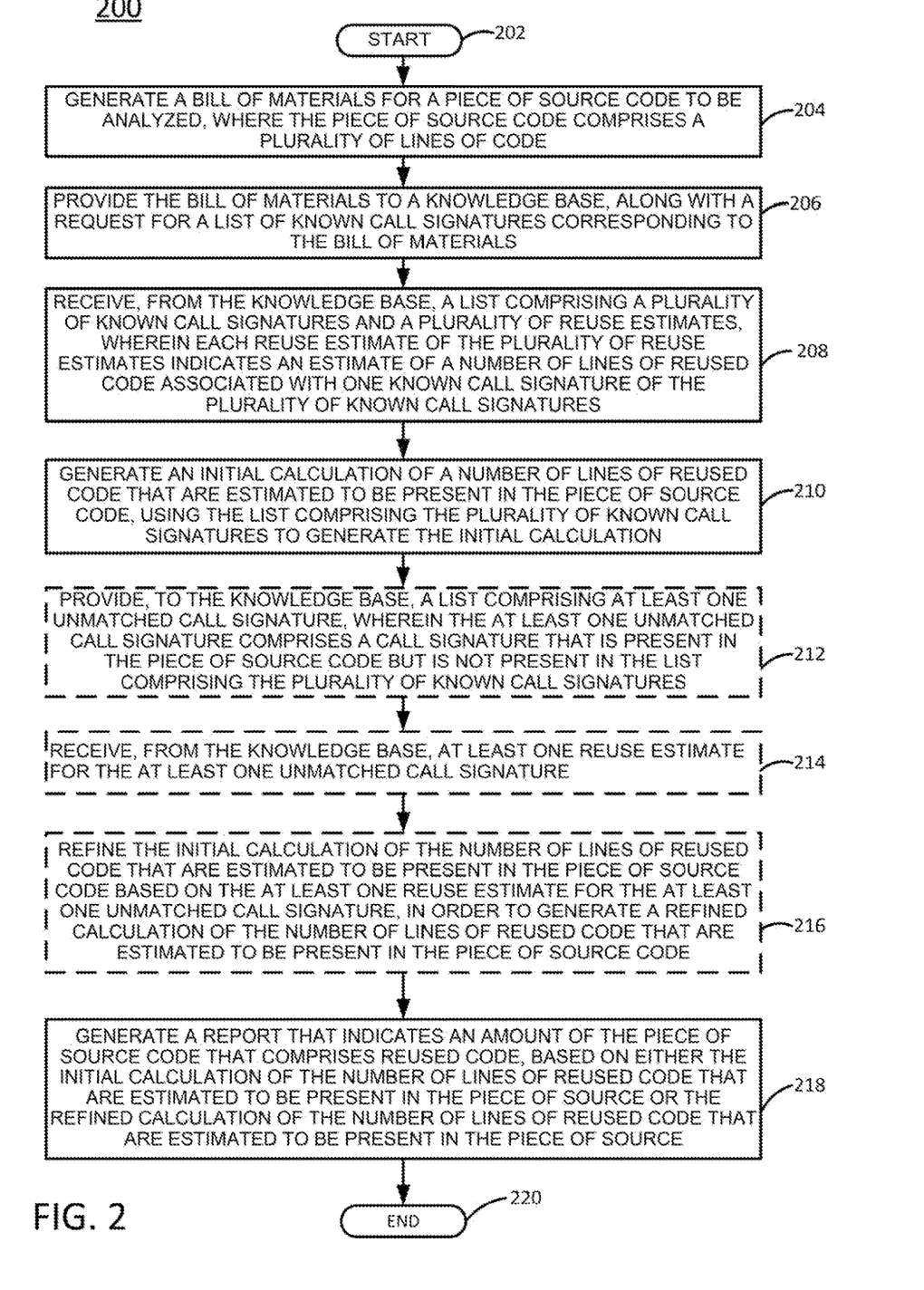
FIG. 2 illustrates a flowchart of an example method for automated quantification of software code reuse, in accordance with the present disclosure.

FIG. 2 illustrates a flowchart of an example method 200 for automated quantification of software code reuse, in accordance with the present disclosure. In one example, steps, functions and/or operations of the method 200 may be performed by a device as illustrated in FIG. 1, e.g., a UE 108-114 or any one or more components thereof. In another example, the steps, functions, or operations of method 200 may be performed by a computing device or system 400, and/or a processing system 402 as described in connection with FIG. 4 below. For instance, the computing device 400 may represent at least a portion of a UE 108-114 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may generate a bill of materials for a piece of source code to be analyzed, where the piece of source code comprises a plurality of lines of code. As discussed above, one aim of the analysis of the piece of source code is to determine how much (e.g., what percentage, ratio, number of lines, etc.) of the piece of source code comprises reused code. In one example, the piece of source code may be obtained from a repository of source code or from source files. The piece of source code may be a newly developed piece of source code (i.e., developed by a human code developer or by a computer/ artificial intelligence-driven system), or may be a piece of source code that was developed in the past and which is now being analyzed for quantification of source code reuse. In a further example, the piece of source code may comprise a software installation package (e.g., all of the information that an operating system requires to install or uninstall an application or product and to run the setup user interface, including an installation database, a summary information stream, data streams for various parts of the installation, transforms, internal source files, and/or external source files or cabinet files required by the installation).

The bill of materials for a piece of source code comprises a list of components in the piece of source code, such as open source software components and commercial (e.g., third party) software components. Software developers often leverage available open source software components and commercial software components when developing new software products. In this case, a bill of materials may allow a software developer to ensure that those open source software components and commercial software components are up to date, as well as to quickly identify and remediate new vulnerabilities.

In one example, the bill of materials for the piece of source code may include a calculation of the total number of lines of code in the piece of source code. The total number of lines of code in the piece of source code may be computed according to one or more rules acquired from a knowledge base (e.g., a database, or an application server). These rules may be specific to the programming language in which the piece of source code is written, as some programming languages may be considered more compact or succinct than others. For instance, the calculation of the total number of lines of code may comprise a physical count of the lines of code or a logical count of the lines of code. Within this context, a physical count of the lines of code is understood to refer to a number of lines in the text of the piece of source code, not including comment lines. A logical count of the lines of code is understood to refer to the number of executable statements in the piece of source code. However, the specific definition of an executable "statement" may vary with the specific programming language used to write the piece of source code. For instance, a simple logical count measure for a C-like programming language might comprise a count of the number of statement-terminating semicolons.

In one example, the knowledge base described above may comprise a repository of assumptions and policies that may be used in quantifying code reuse. Assumptions might include, for instance, how deep into the piece of source code the analysis should go (e.g., layers of the piece of source code may go as deep as the operating system level, but the software developer may wish to stop the analysis at a higher layer).

Policies may include rules for counting lines of code that are specific to particular programming languages, as discussed above. For instance, the calculation of the total number of lines of code may be limited by predefined boundaries that are meant to constrain the calculation to relevant results. These boundaries may, for example, exclude certain items (e.g., programming language components, comment lines, etc.) from being counted as lines of code. These boundaries may also limit the number of dependencies to no more than a threshold number of dependencies. In a further example, the boundaries may require that bytecode size and/or call hierarchy be analyzed as an additional input.

In a further example, the bill of materials for the piece of source code may also include an inventory of dependencies that are present in the piece of source code and the libraries used to build the piece of source code. Within this context, a dependency is understood to refer to an essential functionality or library, or piece of code that's essential for a different part of the piece of source code to work. For instance, a particular line of code may depend on a specific library. Within this context, a library is understood to refer to a collection of non-volatile resources (e.g., configuration data, documentation, help data, message templates, prewritten code and subroutines, classes, values, or type specifications).

In step 206, the processing system may provide the bill of materials to a knowledge base (e.g., the same knowledge base from which the rules, assumptions, and policies may be acquired in step 204), along with a request for a list of known call signatures corresponding to the bill of materials. In one example, a call signature comprises keyword arguments which are known to be used to call a specific method in source code.

In this case, the knowledge base may store a plurality of known call signatures which may be observed in source code. The knowledge base may further store, for each known call signature, an estimate of a number of lines of reused code. In other words, each known call signature may be associated with an estimate that indicates that when the each known call signature is detected in a piece of source code, a certain number of lines of code in the piece of source code (e.g., n lines) are likely to have been reused. As an example, a call signature of "opensource call" may be associated with ten lines of reused code.

In a further example, the estimate of the number of lines of reused code that is associated with a call signature may include a confidence score indicating how likely the call signature's presence is to indicate reused code. For instance, continuing the example of the "opensource call" call signature that is associated with ten lines of reused code, the confidence associated with the call signature may be one hundred percent (e.g., whenever the "opensource call" call signature is detected, it is one hundred percent likely that ten lines of code have been reused). In one example, the estimate of the number of lines of reused code and/or the confidence associated with a call signature may be determined using machine learning techniques (e.g., support vector machines, convolutional neural networks, random forest, linear regression, and/or other types of machine learning techniques). For instance, a machine learning technique may be trained to take a piece of source code containing a call signature as an input and to generate as an output a corresponding estimate of the number of lines of reused code and/or a corresponding confidence in the presence of reused code. The piece of source code in this case may provide context for the use of the call signature that may be helpful in determining code reuse.

In step 208, the processing system may receive, from the knowledge base, a list comprising a plurality of known call signatures and a plurality of reuse estimates, wherein each reuse estimate of the plurality of reuse estimates indicates an estimate of a number of lines of reused code associated with one known call signature of the plurality of known call signatures. The list may be generated by the knowledge base in response to the processing system providing the bill of materials in step 206. As discussed above, a reuse estimate for a call signature may also include a confidence indicating a likelihood that the presence of the call signature indicates the presence of number of lines of reused code.

In step 210, the processing system may generate an initial calculation of a number of lines of reused code that are estimated to be present in the piece of source code, using the list comprising the plurality of known call signatures to generate the initial calculation. For instance, the processing system may scan the piece of source code for the occurrence of a first known call signature of the plurality of known call signatures. If the first known call signature is detected in the piece of source code, then the processing system may assign a reuse estimate to the occurrence of the first known call signature in the piece of source code that corresponds to the first known call signature (e.g., if an "opensource call' call signature is detected in the piece of source code, the processing system may assign an estimate of ten lines of reused code to each occurrence of the "opensource call" call signature in the piece of source code).

The processing system may scan the piece of source code for each known call signature of the plurality of known call signatures, and may assign the corresponding reuse estimate to each occurrence of a known call signature that is detected. The processing system may then aggregate all of the reuse estimates that have been assigned to call signatures detected in the source code in order to generate the initial calculation. Aggregation of the reuse estimates may comprise a simple sum of all assigned reuse estimates or a weighted sum (e.g., weighted by the corresponding confidences, if available) of the reuse estimates.

In optional step 212 (illustrated in phantom), the processing system may provide, to the knowledge base, a list comprising at least one unmatched call signature, wherein the at least one unmatched call signature comprises a call signature that is present in the piece of source code but is not present in the list comprising the plurality of known call signatures. In other words, the at least one unmatched call signature comprises a detected call signature that could not be matched to the information provided by the knowledge base in step 208. In some examples, the processing system may not detect any unmatched call signatures in the piece of source code. If, however, the processing system does detect at least one unmatched call signature, then the processing system may query the knowledge base in order to refine the initial calculation of a number of lines of reused code that are estimated to be present in the piece of source code, as discussed in further detail below.

In optional step 214 (illustrated in phantom), the processing system may receive, from the knowledge base, at least one reuse estimate for the at least one unmatched call signature. In one example, the at least one reuse estimate may comprise a reuse estimate that is newly generated by the knowledge base (or by a data source to which the knowledge base has access) for the unmatched call signature (i.e., where the knowledge base did not previously store a reuse estimate for the at least one unmatched call signature).

It should be noted that, in some cases, the at least one unmatched call signature may not be associated with reused code. That is, the lines of code associated with the at least one unmatched call signature may be newly generated for the piece of source code and may not be deemed as reused code. In this case, in one example, the knowledge base may not be able to find any evidence that the at least one unmatched call signature comprises any lines of reused code. As such, the knowledge base may provide a reuse estimate of zero (i.e., zero lines of code reused) for the at least one unmatched call signature. However, the knowledge base may make note of the number of lines of code making up the at least one unmatched call signature and may save information relating to the at least one unmatched call and the number of lines of code making up the at least one unmatched call signature, so that the next time the at least one unmatched call signature is encountered in another piece of source code, a reuse estimate for the at least one unmatched call signature can then be provided.

In one example, the knowledge base may use a plurality of different analysis techniques in order to generate a reuse estimate for an unmatched call signature. The analysis techniques that are used may depend on the size of the piece of source code (or the number of lines of the piece of source code containing the unmatched signature), the programming language in which the piece of source code is written, the nesting depth of the analysis (e.g., whether analysis of the source code is to go to the source code level, the software virtual machine (e.g., Java or interpreter and its libraries) level, dynamic and static link/dependencies level, etc.), and/or other considerations. In one example, the analysis technique may be tightly coupled to the programming language in which the piece of source code is written and the runtime environment for the piece of source code, so not all available analysis techniques may be appropriate for all possible programming languages and/or nesting depths.

In one example, the selection of an analysis technique to generate the reuse estimate may be configurable. For instance, a user may provide one or more constraints which may influence which analysis techniques can be used. As an example, a time constraint that limits the amount of time for the analysis might mean that analysis techniques which take longer to run should be avoided, a resource constraint which limits access to certain privileged resources might mean that analysis techniques which require access to those privileges resources should be avoided, a code license constraint which indicates the presence of commercial code in the piece of source code may mean that certain analysis techniques will be unable to provide reuse estimates for the commercial code, and so on.

In one example, the reuse estimate for an unmatched call signature may comprise an average of the individual estimates computed using the different analysis techniques. For instance, if A comprises a first estimate generated using a first analysis technique, B comprises a second estimate generated using a second analysis technique, and C comprises a third estimate generated using a third analysis technique, then the reuse estimate for the unmatched call signature may be computed as (A+B+C)/3.

In some cases, if an outlier is detected in the individual estimates (e.g., one estimate differs from the other estimates by more than a threshold variance), then the outlier could be removed from consideration. For instance, if the threshold variance is +/−n, and B is n+1 more than A and n+2 more than C, then B may be ignored, and the reuse estimate for the unmatched call signature may simply be computed as (A+C)/2. If estimates generated using the second analysis technique are frequently determined to be outliers (e.g., are outliers more than a threshold percentage of the time), then this may indicate to the knowledge base that the second analysis technique is unreliable and should no longer be used.

In a further example, a reuse estimate for an unmatched call signature may be generated using machine learning and/or artificial intelligence techniques e.g., support vector machines, convolutional neural networks, random forest, linear regression, and/or other types of machine learning techniques). For instance, a machine learning model may be trained to take as an input a call signature extracted from one or more lines of source code and to generate as an output a reuse estimate for the call signature.

Optionally, the knowledge base may store the newly generated at least one reuse estimate for the at least one unmatched call signature. The at least one unmatched call signature may thus now become a known call signature. This may allow the at least one reuse estimate for the at least one unmatched call signature to be used in a subsequent analysis of another piece of source code. For instance, if the at least one unmatched call signature is later detected to be present in the bill of materials for another piece of source code, then the at least one reuse estimate for the at least one unmatched call signature can be provided for quantification of code reuse in the another piece of source code. Thus, the contents of the knowledge base may continuously evolve as the knowledge base is accessed to analyze different pieces of source code and as new, previously unknown call signatures are detected in the different pieces of source code. In one example, a hash may be used to store the newly generated at least one reuse estimate for the at least one unmatched call signature.

In optional step 216 (illustrated in phantom) the processing system may refine the initial calculation of the number of lines of reused code that are estimated to be present in the piece of source code based on the at least one reuse estimate for the at least one unmatched call signature, in order to generate a refined calculation of the number of lines of reused code that are estimated to be present in the piece of source code. In other words, the initial calculation of the number of lines of reused code that are estimated to be present in the piece of source code may be updated to account for the at least one reuse estimate for the at least one unmatched call signature. Thus, in one example, the refined calculation of the number of lines of reused code that are estimated to be present in the piece of source code may be greater than the initial calculation of the number of lines of reused code that are estimated to be present in the piece of source. For instance, if the initial calculation of the number of lines of reused code that are estimated to be present in the piece of source estimated that the piece of source code contained x lines of reused code, and one unmatched call signature was detected and determined to potentially correspond to y lines of reused source code, the refined calculation of the number of lines of reused code that are estimated to be present in the piece of source may equal (x+y) lines.

In step 218, the processing system may generate a report that indicates an amount of the piece of source code that comprises reused code, based on either the initial calculation of the number of lines of reused code that are estimated to be present in the piece of source (if no unmatched call signatures were detected in the piece of source code) or the refined calculation of the number of lines of reused code that are estimated to be present in the piece of source (if at least one unmatched call signature was detected in the piece of source code). As discussed above, the amount of the piece of source code that comprises reused code may be expressed in the report as a percentage or fraction (e.g., a ratio of the number of lines of reused code to the total number of lines in the piece of source code). Optionally, the processing system may store the report (e.g., locally or remotely).

The method 200 may end in step 220.

Figure 3:
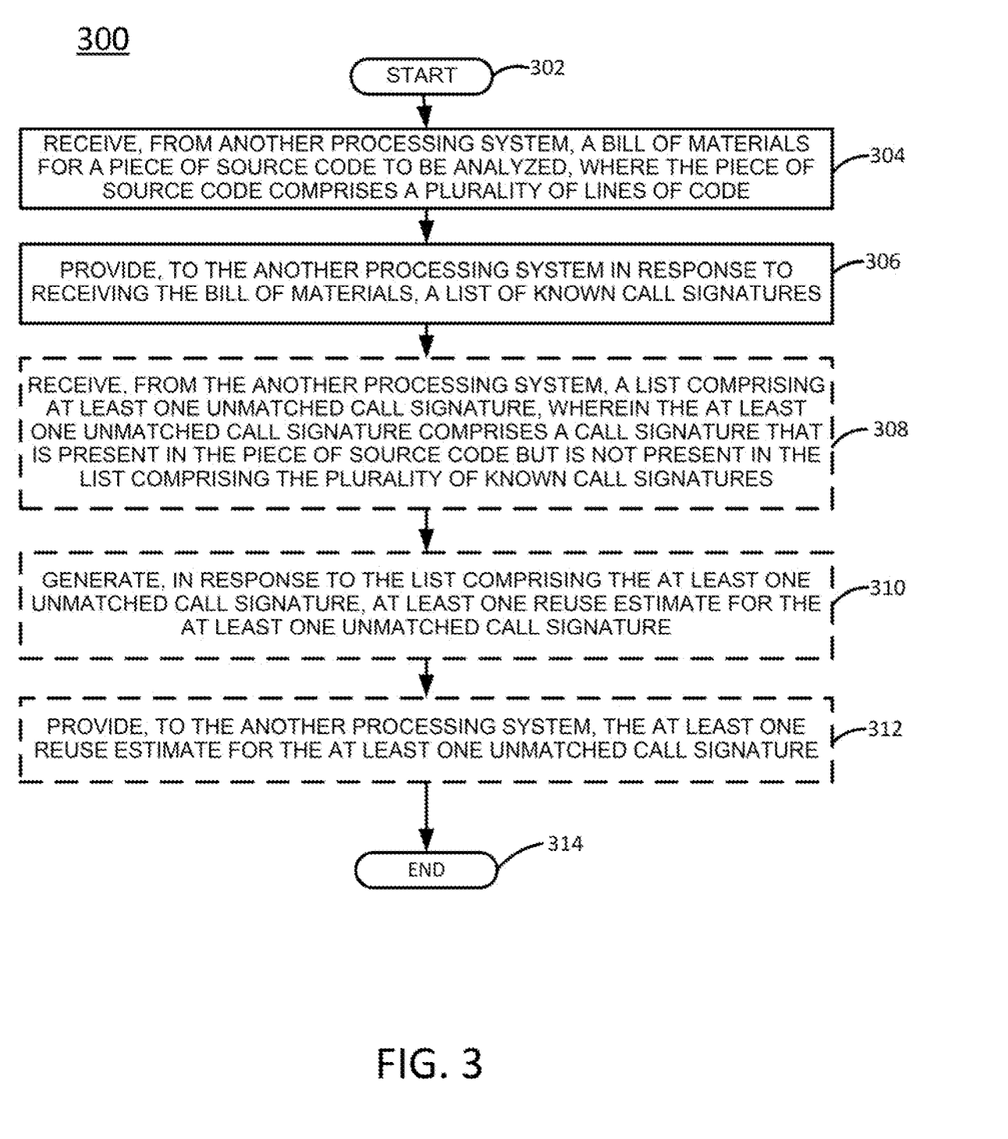
FIG. 3 illustrates a flowchart of an example method for automated quantification of software code reuse, in accordance with the present disclosure.

FIG. 3 illustrates a flowchart of an example method 300 for automated quantification of software code reuse, in accordance with the present disclosure. In one example, steps, functions and/or operations of the method 300 may be performed by a device as illustrated in FIG. 1, e.g., AS 104, DB 106 or any one or more components thereof (e.g., a "knowledge base" as described above). In another example, the steps, functions, or operations of method 300 may be performed by a computing device or system 400, and/or a processing system 402 as described in connection with FIG. 4 below. For instance, the computing device 400 may represent at least a portion of AS 104 or DB 106 in accordance with the present disclosure. For illustrative purposes, the method 300 is described in greater detail below in connection with an example performed by a processing system, such as processing system 402.

The method 300 begins in step 302 and proceeds to step 304. In step 304, the processing system may receive, from another processing system (e.g., a UE), a bill of materials for a piece of source code to be analyzed, where the piece of source code comprises a plurality of lines of code. As discussed above, one aim of the analysis of the piece of source code is to determine how much (e.g., what percentage) of the piece of source code comprises reused code.

In one example, the bill of materials for the piece of source code comprises a list of components in the piece of source code, such as open source software components and commercial (e.g., third party) software components. In a further example, the bill of materials for the piece of source code may include a calculation of the total number of lines of code in the piece of source code. The total number of lines of code in the piece of source code may be computed according to one or more rules provided by the processing system to the another processing system. These rules may be specific to the programming language in which the piece of source code is written, as discussed above. The calculation of the total number of lines of code may comprise a physical count of the lines of code or a logical count of the lines of code. In a further example, the bill of materials for the piece of source code may also include an inventory of dependencies that are present in the piece of source code and the libraries used to build the piece of source code.

In step 306, the processing system may provide, to the another processing system in response to receiving the bill of materials, a list of known call signatures. In one example, a call signature comprises keyword arguments which are known to be used to call a specific method in source code. In this case, the processing system may store or have access to a plurality of known call signatures which may be observed in source code. The processing system may further provide, for each known call signature, an estimate of a number of lines of reused code. In other words, each known call signature may be associated with an estimate that indicates that when the each known call signature is detected in a piece of source code, a certain number of lines of code in the piece of source code (e.g., n lines) are likely to have been reused. In a further example, the estimate of the number of lines of reused code that is associated with a call signature may include a confidence score indicating how likely the call signature's presence is to indicate reused code. In one example, the list of known call signatures that is provided is based on or responsive to the bill of materials, e.g., the list of known call signatures is selected from a larger pool of known call signatures. In other words, the bill of materials is analyzed in selecting the pertinent list of known call signatures to be forwarded to the another processing system.

In optional step 308 (illustrated on phantom), the processing system may receive, from the another processing system, a list comprising at least one unmatched call signature, wherein the at least one unmatched call signature comprises a call signature that is present in the piece of source code but is not present in the list comprising the plurality of known call signatures. In other words, the at least one unmatched call signature comprises a detected call signature that could not be matched to the information provided by the processing system in step 306. In some examples, the another processing system may not detect any unmatched call signatures in the piece of source code. If, however, the another processing system does detect at least one unmatched call signature, then the another processing system may query the processing system in order to obtain an estimate of a number of lines of reused code that are present in the piece of source code as a result of the at least one unmatched call signature, as discussed above.

In optional step 310 (illustrated in phantom), the processing system may generate, in response to the list comprising the at least one unmatched call signature, at least one reuse estimate for the at least one unmatched call signature. In one example, the at least one reuse estimate may comprise a reuse estimate that is newly generated by the processing system (or by a data source to which the processing system has access) for the at least one unmatched call signature (i.e., where the processing system did not previously store a reuse estimate for the at least one unmatched call signature). In other words, in one embodiment the processing system may utilize additional resources external to the processing system to ascertain the at least one reuse estimate. Alternatively, in one embodiment the processing system may correlate the at least one reuse estimate for the at least one unmatched call signature from other known call signatures, e.g., based on some common elements of the at least one unmatched call signature with other known call signatures.

As discussed above in connection with step 214 of the method 200, the processing system may use a plurality of different analysis techniques in order to generate a reuse estimate for an unmatched call signature. The analysis techniques that are used may depend on the size of the piece of source code (or the line(s) of the piece of source code containing the unmatched signature), the programming language in which the piece of source code is written, and/or other considerations.

Optionally, the processing system may store the newly generated at least one reuse estimate for the at least one unmatched call signature. The at least one unmatched call signature may thus now become a known call signature. This may allow the at least one reuse estimate for the at least one unmatched call signature to be used in a subsequent analysis of another piece of source code. For instance, if the at least one unmatched call signature is later detected to be relevant in view of the bill of materials for another piece of source code, then the at least one reuse estimate for the at least one unmatched call signature can be provided for quantification of code reuse in the another piece of source code. In one example, a hash may be used to store the newly generated at least one reuse estimate for the at least one unmatched call signature.

In optional step 312 (illustrated in phantom) the processing system may provide, to the another processing system, the at least one reuse estimate for the at least one unmatched call signature. This may allow the another processing system to refine an estimate of a number of reused lines of code in the piece of source code being analyzed.

The method 300 may end in step 314.

Thus, examples of the present disclosure provide an automated means for discovering and quantifying code reuse. In one example, each line of code in a piece of source code may be analyzed and categorized (e.g., as reused or as not reused) using a plurality of analysis techniques. In another example, the source code may be scanned for call signatures associated with known system calls, and the source code may be assigned a certain number of assumed lines of reused code for each known system call that is detected (where different system calls may be associated with different numbers of assumed lines of reused code). This may provide an initial estimate of the number of lines of reused code in the piece of source code. In a further example, if call signatures are detected in the piece of source code that cannot be matched to known system calls, then estimates of the numbers of reused lines of code associated with these call signatures may be newly calculated and used to refine the initial estimate. The newly calculated estimates may also be stored (as estimates for now-known system calls) for future use, thereby expanding the knowledge of the system as new system calls are encountered. Thus, examples of the present disclosure allow one to quantify the amount of code in a piece of source code that has been reused (e.g., as m percent of the piece of source code).

It should be noted that the methods 200 and/or 300 may be expanded to include additional steps or may be modified to include additional operations with respect to the steps outlined above. In addition, although not specifically specified, one or more steps, functions, or operations of the methods 200 and/or 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 and/or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for quantifying software code reuse in an automated manner, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for quantifying software code reuse in an automated manner (e.g., a software program comprising computer-executable instructions) can be loaded into memory 404 and executed by hardware processor element 402 to implement the steps, functions, or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for quantifying software code reuse in an automated manner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

generating, by a processing system including at least one processor, a bill of materials for a piece of source code to be analyzed, where the piece of source code comprises a plurality of lines of code;

providing, by the processing system, the bill of materials to a knowledge base, along with a request for a plurality of known call signatures corresponding to the bill of materials;

receiving, by the processing system from the knowledge base, a list comprising the plurality of known call signatures and a plurality of reuse estimates, wherein each reuse estimate of the plurality of reuse estimates indicates an estimate of a number of lines of reused code associated with one known call signature of the plurality of known call signatures;

generating, by the processing system, an initial calculation of a number of lines of reused code that are estimated to be present in the piece of source code, using the list comprising the plurality of known call signatures to generate the initial calculation, wherein the generating the initial calculation comprises:

scanning, by the processing system, the piece of source code for each known call signature of the plurality of known call signatures;

assigning, by the processing system, a corresponding reuse estimate of the plurality of reuse estimates to each occurrence of a known call signature of the plurality of known call signatures that is detected in the piece of source code; and aggregating, by the processing system, all corresponding reuse estimates that have been assigned to occurrences of known call signatures of the plurality of known call signatures that are detected in the piece of source code to generate the initial calculation;

generating, by the processing system, a report that indicates an amount of the piece of source code that comprises reused code, based on at least the initial calculation of the number of lines of reused code that are estimated to be present in the piece of source code;

providing, by the processing system to the knowledge base, a list comprising at least one unmatched call signature, wherein the at least one unmatched call signature comprises a call signature that is present in the piece of source code but is not present in the list comprising the plurality of known call signatures;

receiving, by the processing system from the knowledge base, at least one reuse estimate for the at least one unmatched call signature; and refining, by the processing system, the initial calculation of the number of lines of reused code that are estimated to be present in the piece of source code based on the at least one reuse estimate for the at least one unmatched call signature, in order to generate a refined calculation of the number of lines of reused code that are estimated to be present in the piece of source code.

2. The method of claim 1, wherein the bill of materials comprises a list of components in the piece of source code.

3. The method of claim 2, wherein the bill of materials further comprises a calculation of a total number of lines of code in the plurality of lines of code.

4. The method of claim 3, wherein the total number of lines of code is computed according to a rule acquired from the knowledge base.

5. The method of claim 4, wherein the rule is specific to a programming language in which the piece of source code is written.

6. The method of claim 1, wherein the bill of materials further comprises an inventory of dependencies that are present in the piece of source code and libraries used to build the piece of source code.

7. The method of claim 1, wherein the processing system retrieves, from the knowledge base, an assumption to be used in the generating the bill of materials, wherein the assumption defines how deep into the piece of source code a count of the plurality of lines of code is to go.

8. The method of claim 1, wherein each reuse estimate of the plurality of reuse estimates further includes a confidence score indicating how likely a presence of the each call signature in the piece of source code is to indicate a presence of reused code in the piece of source code.

9. The method of claim 1, wherein the refined calculation of the number of lines of reused code that are estimated to be present in the piece of source is greater than the initial calculation of the number of lines of reused code that are estimated to be present in the piece of source code.

10. The method of claim 1, wherein the knowledge base uses a plurality of different analysis techniques to generate the at least one reuse estimate.

11. The method of claim 10, wherein the knowledge base calculates an average of a plurality of reuse estimates for the at least one unmatched call signature, each reuse estimate of the plurality of reuse estimates generated using one of the plurality of different analysis techniques, to produce the at least one reuse estimate.

12. The method of claim 11, wherein any reuse estimates of the plurality of reuse estimates that differ from other reuse estimates of the plurality of reuse estimates by more than a threshold variance are excluded from the average.

13. The method of claim 10, wherein the plurality of different analysis techniques includes at least one machine learning technique that takes as an input a system call and generates as an output a corresponding estimate of a number of lines of reused code.

14. The method of claim 1, wherein the at least one reuse estimate is stored with the at least one unmatched call signature as a new known call signature.

15. The method of claim 1, wherein the report expresses the amount of the piece of source code that comprises reused code as a ratio of the number of lines of reused code to a total number of the plurality of lines of code.

16. The method of claim 1, wherein the report is stored by the processing system.

17. A non-transitory computer-readable medium storing instructions which, when executed by a processing system including at least one processor, cause the processing system to perform operations, the operations comprising:

generating a bill of materials for a piece of source code to be analyzed, where the piece of source code comprises a plurality of lines of code;

providing the bill of materials to a knowledge base, along with a request for a plurality of known call signatures corresponding to the bill of materials;

receiving, from the knowledge base, a list comprising the plurality of known call signatures and a plurality of reuse estimates, wherein each reuse estimate of the plurality of reuse estimates indicates an estimate of a number of lines of reused code associated with one known call signature of the plurality of known call signatures;

generating an initial calculation of a number of lines of reused code that are estimated to be present in the piece of source code, using the list comprising the plurality of known call signatures to generate the initial calculation, wherein the generating the initial calculation comprises:

scanning the piece of source code for each known call signature of the plurality of known call signatures;

assigning a corresponding reuse estimate of the plurality of reuse estimates to each occurrence of a known call signature of the plurality of known call signatures that is detected in the piece of source code; and aggregating all corresponding reuse estimates that have been assigned to occurrences of known call signatures of the plurality of known call signatures that are detected in the piece of source code to generate the initial calculation;

generating a report that indicates an amount of the piece of source code that comprises reused code, based on at least the initial calculation of the number of lines of reused code that are estimated to be present in the piece of source code;

providing, to the knowledge base, a list comprising at least one unmatched call signature, wherein the at least one unmatched call signature comprises a call signature that is present in the piece of source code but is not present in the list comprising the plurality of known call signatures;

receiving, from the knowledge base, at least one reuse estimate for the at least one unmatched call signature; and refining the initial calculation of the number of lines of reused code that are estimated to be present in the piece of source code based on the at least one reuse estimate for the at least one unmatched call signature, in order to generate a refined calculation of the number of lines of reused code that are estimated to be present in the piece of source code.

18. The non-transitory computer-readable medium of claim 17, wherein the refined calculation of the number of lines of reused code that are estimated to be present in the piece of source is greater than the initial calculation of the number of lines of reused code that are estimated to be present in the piece of source code.

19. The non-transitory computer-readable medium of claim 17, wherein the at least one reuse estimate is stored with the at least one unmatched call signature as a new known call signature.

20. A device comprising:
a processing system including at least one processor; and
a non-transitory computer-readable medium storing instructions which, when executed by the processing system, cause the processing system to perform operations, the operations comprising:
generating a bill of materials for a piece of source code to be analyzed, where the piece of source code comprises a plurality of lines of code;
providing the bill of materials to a knowledge base, along with a request for a plurality of known call signatures corresponding to the bill of materials;
receiving, from the knowledge base, a list comprising the plurality of known call signatures and a plurality of reuse estimates, wherein each reuse estimate of the plurality of reuse estimates indicates an estimate of a number of lines of reused code associated with one known call signature of the plurality of known call signatures;
generating an initial calculation of a number of lines of reused code that are estimated to be present in the piece of source code, using the list comprising the plurality of known call signatures to generate the initial calculation, wherein the generating the initial calculation comprises:
scanning the piece of source code for each known call signature of the plurality of known call signatures;
assigning a corresponding reuse estimate of the plurality of reuse estimates to each occurrence of a known call signature of the plurality of known call signatures that is detected in the piece of source code; and
aggregating all corresponding reuse estimates that have been assigned to occurrences of known call signatures of the plurality of known call signatures that are detected in the piece of source code to generate the initial calculation;
generating a report that indicates an amount of the piece of source code that comprises reused code, based on at least the initial calculation of the number of lines of reused code that are estimated to be present in the piece of source code;
providing, to the knowledge base, a list comprising at least one unmatched call signature, wherein the at least one unmatched call signature comprises a call signature that is present in the piece of source code but is not present in the list comprising the plurality of known call signatures;
receiving, from the knowledge base, at least one reuse estimate for the at least one unmatched call signature; and
refining the initial calculation of the number of lines of reused code that are estimated to be present in the piece of source code based on the at least one reuse estimate for the at least one unmatched call signature, in order to generate a refined calculation of the number of lines of reused code that are estimated to be present in the piece of source code.

* * * * *